US012324939B2

(12) United States Patent
Zhang et al.

(10) Patent No.: US 12,324,939 B2
(45) Date of Patent: Jun. 10, 2025

(54) MOBILE LIQUID NITROGEN FIRE EXTINGUISHING SYSTEM AND METHOD FOR UTILITY TUNNEL

(71) Applicant: CHINA UNIVERSITY OF MINING AND TECHNOLOGY, Jiangsu (CN)

(72) Inventors: Guowei Zhang, Jiangsu (CN); Dong Guo, Jiangsu (CN); Huaxiang Li, Jiangsu (CN); Yinan Sun, Jiangsu (CN); Zheng Li, Jiangsu (CN); Zhiwei Zhang, Jiangsu (CN); Su Yan, Jiangsu (CN); Junbin Huang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 340 days.

(21) Appl. No.: 18/003,312

(22) PCT Filed: Dec. 2, 2020

(86) PCT No.: PCT/CN2020/133285

§ 371 (c)(1),
(2) Date: Dec. 23, 2022

(87) PCT Pub. No.: WO2022/011934

PCT Pub. Date: Jan. 20, 2022

(65) Prior Publication Data

US 2023/0241431 A1 Aug. 3, 2023

(30) Foreign Application Priority Data

Jul. 16, 2020 (CN) ........................ 202010685954.6

(51) Int. Cl.
*A62C 3/02* (2006.01)
*A62C 27/00* (2006.01)
(Continued)

(52) U.S. Cl.
CPC ............ *A62C 3/0221* (2013.01); *A62C 27/00* (2013.01); *A62C 31/05* (2013.01); *A62C 35/023* (2013.01)

(58) Field of Classification Search
CPC ......... A62C 3/0221; A62C 3/00; A62C 3/002; A62C 27/00; A62C 31/05; A62C 31/005;
(Continued)

(56) References Cited

U.S. PATENT DOCUMENTS

2002/0083736 A1* 7/2002 Kotliar ...................... F17C 7/04 169/5
2008/0283255 A1 11/2008 Dubrucq

FOREIGN PATENT DOCUMENTS

CN 1454685 * 3/2003 ............. A62C 35/02
CN 1454685 A 11/2003
(Continued)

OTHER PUBLICATIONS

International Search Report for PCT Application No. PCT/CN2020/133285, dated Apr. 16, 2021, in 5 pages.

*Primary Examiner* — Christopher R Dandridge
(74) *Attorney, Agent, or Firm* — Knobbe, Martens, Olson & Bear, LLP

(57) ABSTRACT

A mobile liquid nitrogen fire extinguishing system for a utility tunnel is provided, including a liquid nitrogen production assembly, a fire extinguishing assembly, a monitoring device, and a liquid nitrogen conveying tubing. The mobile fire extinguishing assembly includes a liquid nitrogen storage tank and a liquid nitrogen booster pump. The liquid nitrogen storage tank is connected to the liquid nitrogen booster pump. The liquid nitrogen booster pump conveys liquid nitrogen to branch pipes in the utility tunnel through the liquid nitrogen conveying tubing. Liquid nitrogen injection ports are formed in each of the branch pipes. The liquid nitrogen production assembly is mobile and
(Continued)

conveys the prepared liquid nitrogen to the liquid nitrogen storage tank. The monitoring device includes a first monitoring assembly and a second monitoring assembly.

11 Claims, 3 Drawing Sheets

(51) Int. Cl.
*A62C 31/05* (2006.01)
*A62C 35/02* (2006.01)

(58) Field of Classification Search
CPC ....... A62C 31/12; A62C 35/023; A62C 35/68; A62C 37/36; A62C 37/38; A62C 5/02; A62C 99/0018; A62C 99/009; B05B 7/1431; F17C 2221/014
See application file for complete search history.

(56) References Cited

FOREIGN PATENT DOCUMENTS

| | | | | | |
|---|---|---|---|---|---|
| CN | 103486823 | A | | 1/2014 | |
| CN | 104747226 | A | | 7/2015 | |
| CN | 204783094 | U | | 11/2015 | |
| CN | 105460450 | A | | 4/2016 | |
| CN | 108915770 | A | | 11/2018 | |
| CN | 109712501 | | * | 5/2019 | ......... A62C 99/0081 |

* cited by examiner

MOBILE LIQUID NITROGEN FIRE EXTINGUISHING SYSTEM AND METHOD FOR UTILITY TUNNEL

CROSS REFERENCE TO RELATED APPLICATIONS

This patent application is a U.S. national phase of International Patent Application No. PCT/CN2020/133285, filed on Dec. 2, 2020, which claims the benefit and priority of Chinese Patent Application No. 202010685954.6, entitled "MOBILE LIQUID NITROGEN FIRE EXTINGUISHING SYSTEM AND METHOD FOR UTILITY TUNNEL," filed on Jul. 16, 2020, the disclosure of each of which is incorporated by reference herein in its entirety.

TECHNICAL FIELD

The present disclosure relates to the field of utility tunnel fire extinguishing, and in particular, to a mobile liquid nitrogen fire extinguishing system and a method for an utility tunnel.

BACKGROUND

The fire prevention and extinguishing systems of the urban underground utility tunnel in China mainly cover a dry powder fire extinguishing system, a water spray fire extinguishing system, and a water mist fire extinguishing system, but there are some shortcomings in all these systems. For example, in the fire extinguishing systems adopted for the existing utility tunnel, the dry powder fire extinguishing system requires relatively high starting current with relatively low reliability, which will also bring about secondary disasters. Besides, as the interior of the basement is wet, the dry powder is easy to condense at the moment of being sprayed due to the influence of water vapor, resulting in a poor fire extinguishing effect. The water mist and water spray fire extinguishing systems incur large initial investment as they need to be equipped with a large number of fire water supply pipelines, and when there are obstacles, the water mist and water spray cannot be quickly and evenly distributed in the entire protection space, leaving a dead corner behind during fire extinguishing.

Nitrogen is a new inert gas fire extinguishing agent, which has an excellent effect on extinguishing fires in enclosed spaces. The existing system mainly uses liquid nitrogen for fire prevention and extinguishing through two ways, namely, directly injecting the liquid nitrogen into the protection area through the tubing, or using the liquid nitrogen as an auxiliary extinguishing agent to cool the main extinguishing agent with its cooling capacity and then injecting it into the fire area with the main extinguishing agent.

Direct injection of the liquid nitrogen is mostly used for mine fire extinguishing. A large amount of liquid nitrogen is usually required for fire prevention and extinguishing. However, a preset system does not have liquid nitrogen storage equipment and liquid nitrogen production equipment, so the liquid nitrogen tank trucks need to be temporarily deployed, which cannot ensure the continuous supply of the liquid nitrogen. If the fire extinguishing action lasts for a long time, the demand for liquid nitrogen is large, and long-distance transportation will lead to delayed fire extinguishing and greater risk. When used as an auxiliary extinguishing agent for cooling the main extinguishing agent, the liquid nitrogen usually needs to pass through a long tubing before injection to increase the effect of cooling the main extinguishing agent, leading to gasification of the liquid nitrogen in large amount, which is basically gaseous when entering the protection area, such that the transmission efficiency and cooling capacity are reduced. In addition, when the liquid nitrogen is mixed with other fire extinguishing agents, due to the low temperature of liquid nitrogen and its ease of gasification and expansion, the main fire extinguishing agent may become invalid or the tubing may be blocked, such that it has poor reliability, which is difficult to meet the fire prevention and extinguishing requirements of the utility tunnel. In addition, the traditional supporting fire extinguishing equipment is usually arranged in a fixed way according to the protection area, which cannot be moved in real time, and has problems such as poor flexibility and large space occupation.

SUMMARY

The present disclosure provides a mobile liquid nitrogen fire extinguishing system for an utility tunnel, which has a simple structure, not only achieves a unified process of liquid nitrogen production, liquid nitrogen storage, and liquid nitrogen supply for fire extinguishing and ensures sufficient supply of the liquid nitrogen and continuous fire extinguishing, but also achieves flexible movement, small space occupation, stable conveying of the liquid nitrogen, and higher fire extinguishing efficiency due to an automatic control of fire extinguishing.

To achieve the above objective, the present disclosure provides a mobile liquid nitrogen fire extinguishing system for an utility tunnel, including a liquid nitrogen production assembly, a fire extinguishing assembly, a monitoring device, a liquid nitrogen conveying tubing, and a controller.

The fire extinguishing assembly is arranged on a mobile platform, and includes a liquid nitrogen storage tank and a liquid nitrogen booster pump; and a first liquid outlet on the liquid nitrogen storage tank is connected to the liquid nitrogen booster pump, the liquid nitrogen booster pump is provided with a second liquid outlet connected to a reserved interface of the liquid nitrogen conveying tubing, and conveys liquid nitrogen to branch pipes in the utility tunnel through the reserved interface of the liquid nitrogen conveying tubing, and liquid nitrogen injection ports are formed in each of the branch pipes.

The liquid nitrogen production assembly is mobile, and conveys the liquid nitrogen, which is prepared, into the liquid nitrogen storage tank.

The monitoring device includes a proportional control valve, a first monitoring assembly, and a second monitoring assembly; and the proportional control valve is located between the liquid nitrogen storage tank and the liquid nitrogen booster pump, the first monitoring assembly is mounted on the liquid nitrogen storage tank, and the second monitoring assembly is located between the liquid nitrogen booster pump and the liquid nitrogen conveying tubing.

The controller is connected to the first monitoring assembly for pressure display and pressure regulation inside the liquid nitrogen storage tank, the controller is connected to the second monitoring assembly to control a flow of the liquid nitrogen input into the liquid nitrogen conveying tubing, the controller is connected to the proportional control valve to control a flow input into the liquid nitrogen booster pump, the controller is connected to the liquid nitrogen booster pump to control an output pressure, and the controller is connected to the liquid nitrogen production assembly to control opening and closing of the liquid nitrogen production assembly and liquid nitrogen conversion efficiency.

In some embodiments, the first monitoring assembly may include a pressure gauge, a pressure regulating valve, a gas outlet device, and a pressure relief valve which may be all mounted on the liquid nitrogen storage tank.

In some embodiments, the second monitoring assembly may include a flow meter and a safety valve, the flow meter and the safety valve may be connected in sequence.

In some embodiments, the liquid nitrogen production assembly may include an air compressor, a nitrogen production machine, and a refrigeration liquefier which may be all arranged in a mobile vehicle.

The air compressor may be provided with an air inlet on a side thereof, and an output end of the air compressor may be connected to the nitrogen production machine and the refrigeration liquefier in sequence, and an output end of the refrigeration liquefier may be connected to the liquid nitrogen storage tank.

In some embodiments, the branch pipes may include three branch pipes arranged in layers and arranged at a top, a middle, and a bottom inside the utility tunnel respectively, each of the liquid nitrogen injection ports on a corresponding one of the three branch pipes may be provided with a sensor, the sensor may be connected to a master control of the utility tunnel, and the master control of the utility tunnel transmits alarm and positioning information to the controller.

In some embodiments, the liquid nitrogen production assembly and the liquid nitrogen storage tank may be connected through a first low temperature and high pressure metal hose, the liquid nitrogen storage tank and the liquid nitrogen booster pump may be connected through a second low temperature and high pressure metal hose, and the safety valve and the liquid nitrogen conveying tubing may be connected through a third low temperature and high pressure metal hose.

In some embodiments, the liquid nitrogen booster pump may be provided with a gas outlet.

A mobile liquid nitrogen fire extinguishing method for an utility tunnel includes the following steps.

In step (a), when a fire occurs in a cabin of the utility tunnel, sensing a fire position by a sensor at each of liquid nitrogen injection ports, feeding back a signal to a master control of the utility tunnel, controlling to close corresponding facilities in the utility tunnel by the master control of the utility tunnel, and sending alarm and positioning information to a controller, controlling a liquid nitrogen production assembly and a fire extinguishing assembly by the controller to move to a target location, and connecting the liquid nitrogen production assembly to the fire extinguishing assembly via a metal hose, and connecting the fire extinguishing assembly to a reserved interface of a liquid nitrogen conveying tubing through another metal hose.

Starting a liquid nitrogen booster pump by the controller; regulating an input flow of liquid nitrogen in a liquid nitrogen storage tank by a proportional control valve; after regulating an output pressure by the liquid nitrogen booster pump, enabling the liquid nitrogen enters the liquid nitrogen conveying tubing and branch pipes through a flow meter and a safety valve in sequence; and injecting the liquid nitrogen from the liquid nitrogen injection ports on each of the branch pipes into the utility tunnel to perform a liquid nitrogen fire extinguishing inside the utility tunnel.

In step (b), monitoring a pressure in the liquid nitrogen storage tank by a pressure gauge on the liquid nitrogen storage tank in real time, dividing the pressure into a filling range, a working range, and a dangerous range based on a magnitude of the pressure; if the pressure in the liquid nitrogen storage tank is in the filling range, starting the liquid nitrogen production assembly by the controller, such that surrounding air is extracted by an air compressor from an air inlet on a top of the air compressor for filtering and compression, and conveying the surrounding air to a nitrogen production machine for treatment, producing liquid nitrogen by a refrigeration liquefier by using nitrogen generated by the nitrogen production machine, and supplying the liquid nitrogen to the liquid nitrogen storage tank through a first metal hose; performing the liquid nitrogen fire extinguishing in the utility tunnel normally if the pressure is in the working range; and if the pressure is in the dangerous range, opening a pressure relief valve automatically, so as to discharge nitrogen gas generated after gasification of liquid nitrogen under heating, such that the pressure is recovered to the working range.

In step (c), controlling an automatic simultaneous operation of a liquid nitrogen preparation, a liquid nitrogen storage, and the liquid nitrogen fire extinguishing by the controller; after the liquid nitrogen fire extinguishing is completed, controlling the liquid nitrogen production assembly by the controller such that the liquid nitrogen production assembly stops working when the pressure in the liquid nitrogen storage tank reaches the working range after the liquid nitrogen is supplemented.

In some embodiments, in step (a), calculating an amount of the liquid nitrogen injected from each of the liquid nitrogen injection ports (71) by:

$$m = \left[\frac{V \cdot X_{O_2}}{X} - V\right] \cdot \frac{\rho_{LN}}{\alpha}$$

Where m is a mass of the liquid nitrogen injected, kg; x is an oxygen content of a fire extinguishing target, %; V is a volume of a protection area, $m^3$; $\rho_{LN}$ is a density of the liquid nitrogen; $\alpha$ is an expansion volume ratio of the liquid nitrogen during gasification, which is 717 at 25° C.; and $X_{O_2}$ is a volume fraction of oxygen in atmosphere, with a value of 21%.

Compared with the prior art, the mobile liquid nitrogen fire extinguishing system for an utility tunnel has the following advantages.

1) Since the fire extinguishing system is provided with the liquid nitrogen production assembly and the fire extinguishing assembly, the liquid nitrogen is prepared through the air compressor, the nitrogen production machine, and the refrigeration liquefier, and stored in the liquid nitrogen storage tank. When fire extinguishing is performed, the liquid nitrogen in the liquid nitrogen storage tank enters the liquid nitrogen conveying tubing and the branch pipes through the liquid nitrogen booster pump to extinguish the fire in the utility tunnel. Thus, the unified process of liquid nitrogen preparation, liquid nitrogen storage, and liquid nitrogen fire extinguishing is realized, and the continuous supply of the liquid nitrogen is ensured to avoid the failure to extinguish the fire in time in case of a fire.

2) The fire extinguishing system is provided with the first monitoring component, and the pressure gauge on the liquid nitrogen storage tank monitors the pressure in the tank in real time. The controller controls the matching of the liquid nitrogen production assembly and the fire extinguishing assembly to ensure simultaneous operation of liquid nitrogen production, liquid nitrogen storage and fire extinguishing, so as to realize automatic fire extinguishing. In addition, the sensor for sensing fire is arranged to transmit the geographical position of the utility tunnel section in the fire accident to the controller through the master control of the utility tunnel, and the controller controls the movement of the liquid nitrogen production assembly and the fire extinguishing assembly. Therefore, the fire extinguishing system not only realizes automatic fire extinguishing with high efficiency and reliability, but also is flexible and convenient, occupies less space and is more efficient.

3) The fire extinguishing system is provided with the second monitoring assembly to monitor the input amount of the liquid nitrogen and ensure safety by the flow meter and the safety valve respectively, and the proportional control valve is arranged between the liquid nitrogen storage tank and the liquid nitrogen booster pump to control the flow of the liquid nitrogen. The controller outputs a control signal to regulate the output pressure of the liquid nitrogen booster pump, such that the pressure of the liquid nitrogen is increased and maintained stable, and the liquid nitrogen can be conveyed efficiently and continuously as required, so as to improve the fire extinguishing efficiency.

4) The liquid nitrogen storage tank is provided with the gas outlet device, and the liquid nitrogen booster pump is provided with the gas outlet, such that the nitrogen in the liquid nitrogen storage tank can be discharged from the gas outlet device, so as to realize the separation of liquid nitrogen and nitrogen, and ensure the liquid nitrogen transmission efficiency. In addition, the heated and gasified nitrogen in the tubing can be discharged from the gas outlet of the liquid nitrogen booster pump, or the nitrogen can be conveyed from the gas outlet to the liquid nitrogen conveying tubing to meet the use needs in different situations. Moreover, the liquid nitrogen is injected quantitatively according to the calculation formula to achieve targeted fire extinguishing, avoid excessive injection of liquid nitrogen, and save resources.

Figure 1:
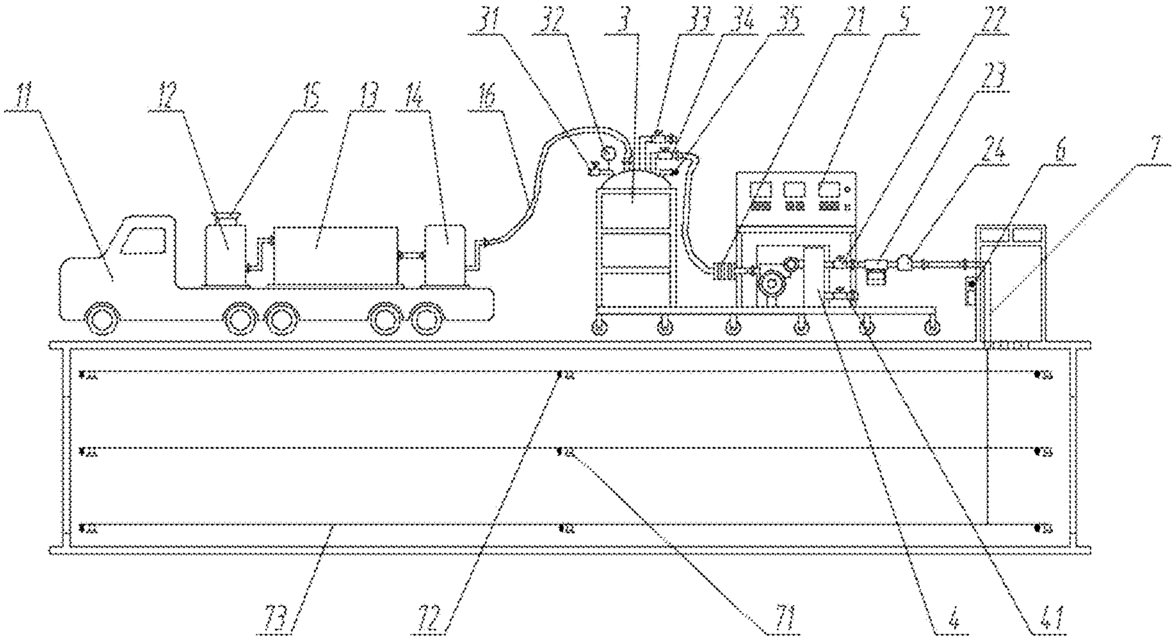
FIG. 1 is an overall front view of a mobile liquid nitrogen fire extinguishing system for an utility tunnel according to embodiments of the present disclosure.

Reference numerals: 11. mobile vehicle, 12. air compressor, 13. nitrogen production machine, 14. refrigeration liquefier, 15. air inlet, 16. metal hose, 21. proportional control valve, 22. second liquid outlet, 23. flow meter, 24. safety valve, 3. liquid nitrogen storage tank, 31. pressure regulating valve, 32. pressure gauge, 33. gas outlet device, 34. first liquid outlet, 35. pressure relief valve, 4. liquid nitrogen booster pump, 41. gas outlet, 5. controller, 6. master control of utility tunnel, 7. liquid nitrogen conveying tubing, 71. liquid nitrogen injection port, 72. sensor, and 73. branch pipe.

DETAILED DESCRIPTION OF THE EMBODIMENTS

The present disclosure will be further described below with reference to the accompanying drawings.

Figure 2:
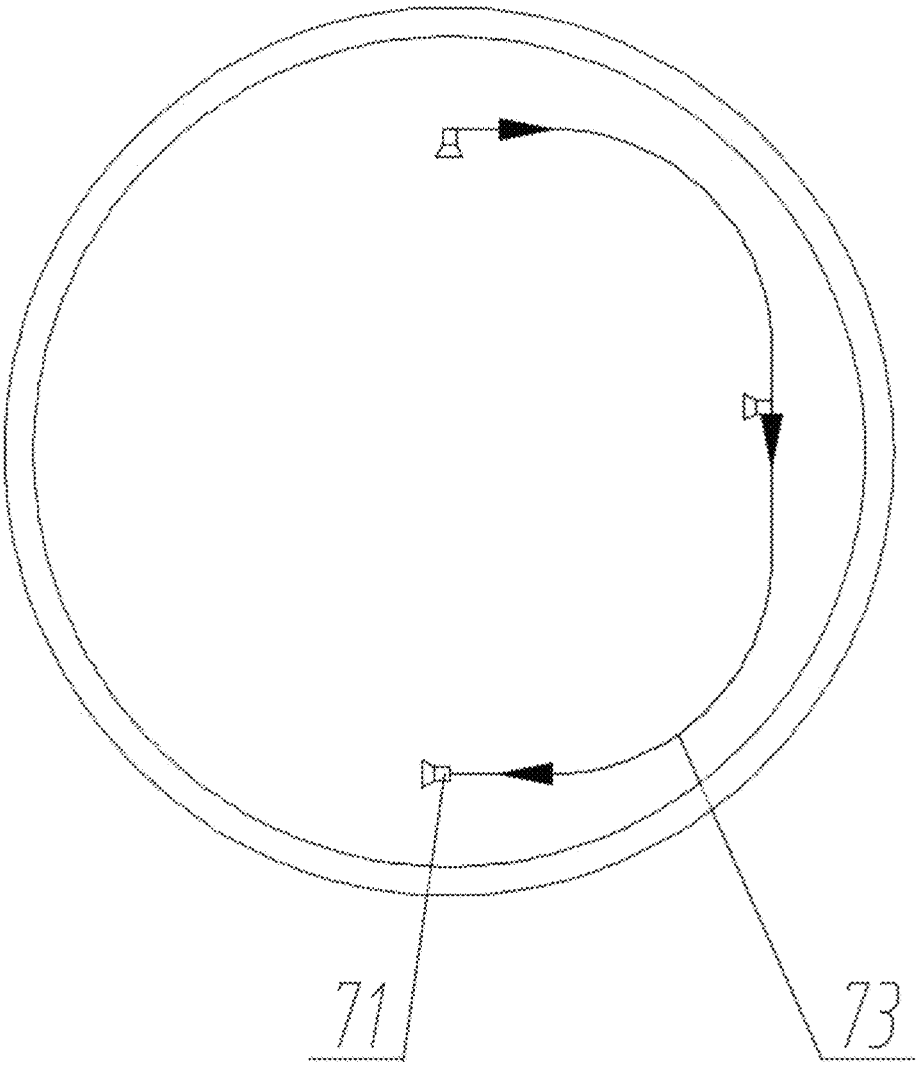
FIG. 2 is a cross section diagram of a branch pipe in the utility tunnel according to embodiments of the present disclosure.
Figure 3:
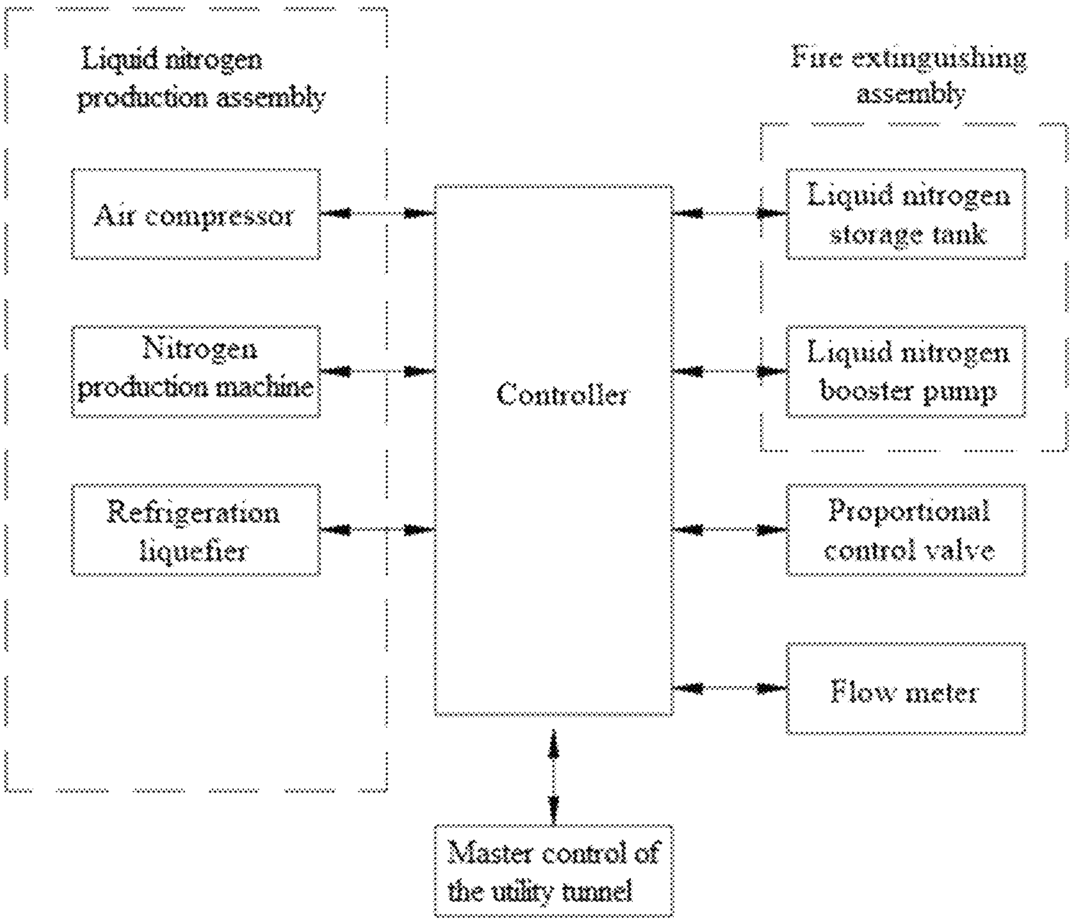
FIG. 3 is a schematic diagram of controlling the mobile liquid nitrogen fire extinguishing system for an utility tunnel according to embodiments of the present disclosure.

As shown in FIG. 1, FIG. 2, and FIG. 3, the present disclosure provides a mobile liquid nitrogen fire extinguishing system for an utility tunnel, including a liquid nitrogen production assembly, a fire extinguishing assembly, a monitoring device, a liquid nitrogen conveying tubing 7, and a controller 5.

The fire extinguishing assembly is arranged on a mobile platform, and includes a liquid nitrogen storage tank 3 and a liquid nitrogen booster pump 4; and a first liquid outlet 34 on the liquid nitrogen storage tank 3 is connected to the liquid nitrogen booster pump 4, the liquid nitrogen booster pump 4 is provided with a second liquid outlet 22 connected to a reserved interface of the liquid nitrogen conveying tubing 7, and conveys liquid nitrogen to branch pipes 73 in the utility tunnel through the reserved interface of the liquid nitrogen conveying tubing 7, and liquid nitrogen injection ports 71 are formed in each of the branch pipes 73.

The liquid nitrogen production assembly is mobile, and conveys the liquid nitrogen, which is prepared, into the liquid nitrogen storage tank 3.

The monitoring device includes a proportional control valve 21, a first monitoring assembly, and a second monitoring assembly; and the proportional control valve 21 is located between the liquid nitrogen storage tank 3 and the liquid nitrogen booster pump 4, the first monitoring assembly is mounted on the liquid nitrogen storage tank 3, and the second monitoring assembly is located between the liquid nitrogen booster pump 4 and the liquid nitrogen conveying tubing 7.

The controller 5 is connected to the first monitoring assembly for pressure display and pressure regulation inside the liquid nitrogen storage tank 3, the controller 5 is connected to the second monitoring assembly to control a flow of the liquid nitrogen input into the liquid nitrogen conveying tubing 7, the controller 5 is connected to the proportional control valve 21 to control a flow input into the liquid nitrogen booster pump 4, the controller 5 is connected to the liquid nitrogen booster pump 4 to control an output pressure, and the controller 5 is connected to the liquid nitrogen production assembly to control opening and closing of the liquid nitrogen production assembly and liquid nitrogen conversion efficiency.

Further, the first monitoring assembly includes a pressure gauge 32, a pressure regulating valve 31, a gas outlet device 33, and a pressure relief valve 35 which are all mounted on the liquid nitrogen storage tank 3.

The pressure on the pressure gauge 32 can be divided into a working range, a filling range, and a dangerous range based on a magnitude of the pressure, which is convenient for identification. The liquid nitrogen storage tank 3 includes an inner tank, a thermal insulation layer and an outer tank from the inside to the outside, so the liquid nitrogen can be effectively stored and insulated, so as to prevent it from being gasified into nitrogen and affecting the fire extinguishing.

Further, the second monitoring assembly includes a flow meter 23 and a safety valve 24. And, a proportional control valve 21 connected to the controller 5 is arranged between the liquid nitrogen storage tank 3 and the liquid nitrogen booster pump 4.

Further, the liquid nitrogen production assembly and the liquid nitrogen storage tank 3 are connected through a first low temperature and high pressure metal hose, the liquid nitrogen storage tank 3 and the liquid nitrogen booster pump 4 are connected through a second low temperature and high pressure metal hose, and the safety valve 24 and the liquid nitrogen conveying tubing 7 are connected through a third low temperature and high pressure metal hose.

Further, the liquid nitrogen production assembly includes an air compressor 12, a nitrogen production machine 13, and a refrigeration liquefier 14 which are all arranged in a mobile vehicle 11.

The air compressor 12 is provided with an air inlet 15 on a side thereof, and an output end of the air compressor 12 is connected to the nitrogen production machine 13 and the refrigeration liquefier 14 in sequence, and an output end of the refrigeration liquefier 14 is connected to the liquid nitrogen storage tank 3.

Further, the branch pipes 73 includes three branch pipes 73 arranged in layers and arranged at a top, a middle, and a bottom inside the utility tunnel respectively, each of the liquid nitrogen injection ports 71 on a corresponding one of the three branch pipes 73 is provided with a sensor 72, the sensor 72 is connected to a master control 6 of the utility tunnel, and the master control 6 of the utility tunnel transmits alarm and positioning information to the controller 5.

Further, the liquid nitrogen booster pump 4 is provided with a gas outlet 41.

When the mobile liquid nitrogen fire extinguishing system for an utility tunnel in the present disclosure is used, the fire extinguishing assembly is closed under normal condition, that is, there is liquid nitrogen in the liquid nitrogen storage tank 3. Due to the first monitoring assembly is provided, the pressure gauge 32 on the liquid nitrogen storage tank 3 monitors the pressure in the tank in real time. When the pressure reaches the set dangerous range, the pressure relief valve 35 is automatically opened to discharge the nitrogen generated by gasification of the liquid nitrogen to restore the pressure to the working range, and the generated nitrogen can be output from the gas outlet device 33 to separate the liquid nitrogen from the nitrogen, so as to ensure the efficient transmission of the liquid nitrogen. When the pressure drops to the filling range, the controller 5 is controlled manually or through the linkage signal to send a control signal to make the liquid nitrogen production assembly to start working. The controller 5 can perform a controlling by the programmable logic controller (PLC), including a global positioning system (GPS) and a network module, which can remotely receive the information transmitted by each assembly and display it in real time.

The air compressor 12 extracts the surrounding air from the air inlet 15 on the top of the air compressor 12 for filtering and compression, and conveys the air to the nitrogen production machine 13 for treatment. The nitrogen generated is made into liquid nitrogen by the refrigeration liquefier 14, and the liquid nitrogen is supplemented to the liquid nitrogen storage tank 3 through a corresponding one of the low temperature and high pressure metal hoses 16. After the pressure is restored to the normal range, the liquid nitrogen production assembly is closed manually or automatically according to the feedback signal, the preparation of liquid nitrogen is stopped, and the system is in a ready to operate state, so as to realize the preparation, supplement, and storage of the liquid nitrogen, and avoid the failure to extinguish the fire in time in case of a fire. Moreover, since the liquid nitrogen production assembly and the fire extinguishing assembly are both mobile structures, the fire extinguishing assembly can be moved to the target utility tunnel in advance.

The liquid nitrogen conveying tubing 7 includes an end connected to the branch pipes 73 in the utility tunnel and another end being a fixedly installed reserved interface. The reserved interface can facilitate the plug-in and docking of the fire extinguishing assembly, and the reserved interface is provided with an automatic valve connected to the controller. During connection, a corresponding one of the low temperature and high pressure metal hoses 16 on the fire extinguishing assembly at a side with the safety valve 24 is directly connected to the reserved interface, and the automatic valve is opened to introduce the liquid nitrogen, so as to ensure the reliability and flexibility of the connection. In addition, the liquid nitrogen production assembly and the fire extinguishing assembly, and the liquid nitrogen storage tank 3 and the liquid nitrogen booster pump 4 are also connected through the low temperature and high pressure metal hoses 16 respectively, such that they can be quickly connected to each other and easily disassembled.

When a fire occurs in a cabin of the utility tunnel, since a sensor 72 is arranged at the liquid nitrogen injection port 71, the sensor 72 senses the fire position, feeds back a signal to a master control 6 of the utility tunnel, determines the geographical position of the utility tunnel section in the fire accident, and sends alarm and positioning information to the controller 5. The controller 5 can control the liquid nitrogen production assembly and the fire extinguishing assembly to move to a target location. At the same time, the master control 6 of the utility tunnel sends control signals to all units in the utility tunnel, automatically closes the exhaust fan and ventilation system in the section to prevent the spread of the fire, confirms that the fire doors at both ends are closed to form a closed space, and can also display the fire situation in the utility tunnel.

The mobile fire extinguishing assembly is started manually or through the controller 5. The liquid outlet pressure is regulated through the pressure regulating valve 31, and the liquid nitrogen enters the liquid nitrogen booster pump 4 from the first liquid outlet 34. Since the proportional control valve 21 is arranged between the liquid nitrogen storage tank 3 and the liquid nitrogen booster pump 4, the flow of the liquid nitrogen is controlled by the electric proportional control valve 21, and the controller 5 outputs the control signal to regulate the output pressure of the liquid nitrogen booster pump 4, such that the pressure of the liquid nitrogen is increased and maintained stable, and the transmission and fire extinguishing are guaranteed.

The corresponding working parameters in the liquid nitrogen production assembly can be automatically controlled by the controller 5, such as the opening and closing of each device, the inlet and outlet gas flow and pressure of the air compressor 12, the output flow pressure and efficiency of the nitrogen production machine 13, and the refrigeration liquefaction efficiency of the refrigeration liquefier 14. Similarly, the opening and closing state of the proportional control valve 21, the output pressure of the liquid nitrogen booster pump 4, and the numerical display and storage of the flow meter can be automatically controlled by the controller 5.

In addition, the gas outlet 41 is arranged on the liquid nitrogen booster pump 4, and the heated and gasified nitrogen in the tubing is discharged from the gas outlet 41 of the liquid nitrogen booster pump 4, which makes the fire extinguishing effect more excellent and more efficient. Or, the liquid nitrogen can be selectively conveyed from the second liquid outlet 22 to the liquid nitrogen conveying tubing 7 by the liquid nitrogen booster pump 4, or the nitrogen is conveyed from the gas outlet 41 to the liquid nitrogen conveying tubing 7 to meet the use needs in different situations. After passing through the flow meter 23 and the safety valve 24, the liquid nitrogen enters the liquid nitrogen conveying tubing 7 of the pre laid utility tunnel, and is finally released through the top liquid nitrogen injection ports 71, the middle liquid nitrogen injection ports 71, and the bottom liquid nitrogen injection ports 71 on each of the branch pipes 73 respectively to realize rapid fire extinguishing. Therefore, the second monitoring assembly is arranged to monitor the flow of the liquid nitrogen by the flow meter 23 and ensure the safety of the tubing.

During the fire extinguishing, the liquid nitrogen in the liquid nitrogen storage tank 3 is continuously consumed, and the pressure indicated by the pressure gauge 32 gradually decreases to the filling range and a feedback signal is send out. After receiving the feedback signal, the controller 5 starts the liquid nitrogen production assembly to start real-time preparation of the liquid nitrogen, and conveys it to the liquid nitrogen storage tank 3 to restore the pressure and keep it in the working range. During the fire extinguishing, the liquid nitrogen production assembly automatically adjusts the working state of each device according to the control signal output by the controller 5, and controls the air inlet flow and the output flow and the output pressure of the liquid nitrogen, so as to ensure the continuous supply of the liquid nitrogen, thus realizing the real-time preparation and supplement of the liquid nitrogen while extinguishing the fire.

During the fire extinguishing, the actual amount of liquid nitrogen injected into the cabin of the utility tunnel is determined through the flow meter 23, and the target injection amount of corresponding combustibles according to the calculation formula is reasonably controlled to avoid excessive injection of the liquid nitrogen. The injection amount is calculated according to the following formula:

$$m = \left[\frac{V \cdot X_{O_2}}{X} - V\right] \cdot \frac{\rho_{LN}}{\alpha}$$

Where m is a mass of the liquid nitrogen injected, kg. x is an oxygen content of a fire extinguishing target, %. V is a volume of a protection area, $m^3$. $\rho_{LN}$ is a density of the liquid nitrogen. $\alpha$ is an expansion volume ratio of the liquid nitrogen during gasification, which is 717 at 25° C. $X_{O_2}$ is a volume fraction of oxygen in atmosphere, with a value of 21%.

Finally, it is confirmed whether to extinguish the fire through the injection amount of the liquid nitrogen and the feedback signal of the sensor 72 at the corresponding one of the liquid nitrogen injection ports 71. After the fire is extinguished, the fire extinguishing assembly is closed by the controller 5, and the liquid nitrogen production assembly continues to supplement the liquid nitrogen to the liquid nitrogen storage tank 3. Until the pressure gauge 32 indicates that the pressure is in the working range again, the controller 5 sends a control signal to jointly close the liquid nitrogen production assembly, and the entire fire extinguishing system stops.

What is claimed is:

1. A mobile liquid nitrogen fire extinguishing system for a utility tunnel, comprising:

a liquid nitrogen production assembly, a fire extinguishing assembly, a monitoring device, a liquid nitrogen conveying tubing, and a controller, wherein the fire extinguishing assembly is arranged on a mobile platform, and comprises a liquid nitrogen storage tank and a liquid nitrogen booster pump; and a first liquid outlet on the liquid nitrogen storage tank is connected to the liquid nitrogen booster pump, the liquid nitrogen booster pump is provided with a second liquid outlet connected to a reserved interface of the liquid nitrogen conveying tubing, and conveys liquid nitrogen to branch pipes in the utility tunnel through the reserved interface of the liquid nitrogen conveying tubing, and liquid nitrogen injection ports are formed in each of the branch pipes;

the liquid nitrogen production assembly is mobile, and conveys the liquid nitrogen, which is prepared, into the liquid nitrogen storage tank;

the monitoring device comprises a proportional control valve, a first monitoring assembly that comprises a pressure gauge, a pressure regulating valve, a gas outlet device, and a pressure relief valve, and a second monitoring assembly that comprises a flow meter and a safety valve;

and the proportional control valve is located between the liquid nitrogen storage tank and the liquid nitrogen booster pump, the first monitoring assembly is mounted on the liquid nitrogen storage tank, and the second monitoring assembly is located between the liquid nitrogen booster pump and the liquid nitrogen conveying tubing; and the controller is connected to the first monitoring assembly for pressure display and pressure regulation inside the liquid nitrogen storage tank, the controller is connected to the second monitoring assembly to control a flow of the liquid nitrogen input into the liquid nitrogen conveying tubing, the controller is connected to the proportional control valve to control a flow input into the liquid nitrogen booster pump, the controller is connected to the liquid nitrogen booster pump to control an output pressure, and the controller is connected to the liquid nitrogen production assembly to control opening and closing of the liquid nitrogen production assembly and liquid nitrogen conversion efficiency.

2. The mobile liquid nitrogen fire extinguishing system for a utility tunnel according to claim 1, wherein the flow meter and the safety valve of the second monitoring assembly are connected in sequence.

3. The mobile liquid nitrogen fire extinguishing system for a utility tunnel according to claim 1, wherein the liquid nitrogen production assembly comprises an air compressor, a nitrogen production machine, and a refrigeration liquefier which are all arranged in a mobile vehicle; and the air compressor is provided with an air inlet on a side thereof, and an output end of the air compressor is connected to the nitrogen production machine and the refrigeration liquefier in sequence, and an output end of the refrigeration liquefier is connected to the liquid nitrogen storage tank.

4. The mobile liquid nitrogen fire extinguishing system for a utility tunnel according to claim 3, wherein the branch pipes comprise three branch pipes arranged in layers and arranged at a top, a middle, and a bottom inside the utility tunnel respectively, each of the liquid nitrogen injection ports on a corresponding one of the three branch pipes is provided with a sensor, the sensor is connected to a master control of the utility tunnel, and the master control of the utility tunnel transmits alarm and positioning information to the controller.

5. The mobile liquid nitrogen fire extinguishing system for a utility tunnel according to claim 2, wherein the liquid nitrogen production assembly and the liquid nitrogen storage tank are connected through a first metal hose, the liquid nitrogen storage tank and the liquid nitrogen booster pump are connected through a second metal hose, and the safety valve and the liquid nitrogen conveying tubing are connected through a third metal hose.

6. The mobile liquid nitrogen fire extinguishing system for a utility tunnel according to claim 4, wherein the liquid nitrogen booster pump is provided with a gas outlet.

7. A mobile liquid nitrogen fire extinguishing method for a utility tunnel, comprising:

(a) when a fire occurs in a cabin of the utility tunnel, sensing a fire position by sensors at liquid nitrogen injection ports, feeding back a signal to a master control of the utility tunnel, controlling to close corresponding facilities in the utility tunnel by the master control of the utility tunnel, and sending alarm and positioning information to a controller, controlling a liquid nitrogen production assembly and a fire extinguishing assembly by the controller to move to a target location, and connecting the liquid nitrogen production assembly to the fire extinguishing assembly via a metal hose, and connecting the fire extinguishing assembly to a reserved interface of a liquid nitrogen conveying tubing through another metal hose; and starting a liquid nitrogen booster pump by the controller; regulating an input flow of liquid nitrogen in a liquid nitrogen storage tank by a proportional control valve; after regulating an output pressure by the liquid nitrogen booster pump, enabling the liquid nitrogen enters the liquid nitrogen conveying tubing and branch pipes through a flow meter and a safety valve in sequence; and injecting the liquid nitrogen from the liquid nitrogen injection ports on each of the branch pipes into the utility tunnel to perform a liquid nitrogen fire extinguishing inside the utility tunnel;

(b) monitoring a pressure in the liquid nitrogen storage tank by a pressure gauge on the liquid nitrogen storage tank in real time, dividing the pressure into a filling range, a working range, and a dangerous range based on a magnitude of the pressure; if the pressure in the liquid nitrogen storage tank is in the filling range, starting the liquid nitrogen production assembly by the controller, such that surrounding air is extracted by an air compressor from an air inlet on a top of the air compressor for filtering and compression, and conveying the surrounding air to a nitrogen production machine for treatment, producing liquid nitrogen by a refrigeration liquefier by using nitrogen generated by the nitrogen production machine, and supplying the liquid nitrogen to the liquid nitrogen storage tank through a first metal hose; performing the liquid nitrogen fire extinguishing in the utility tunnel normally if the pressure is in the working range; and if the pressure is in the dangerous range, opening a pressure relief valve automatically, so as to discharge nitrogen gas generated after gasification of liquid nitrogen under heating, such that the pressure is recovered to the working range; and (c) controlling an automatic simultaneous operation of a liquid nitrogen preparation, a liquid nitrogen storage, and the liquid nitrogen fire extinguishing by the controller; after the liquid nitrogen fire extinguishing is completed, controlling the liquid nitrogen production assembly by the controller such that the liquid nitrogen production assembly stops working when the pressure in the liquid nitrogen storage tank reaches the working range after the liquid nitrogen is supplemented.

8. The mobile liquid nitrogen fire extinguishing method for an utility tunnel according to claim 7, wherein, in step, calculating an amount of the liquid nitrogen injected from each of the liquid nitrogen injection ports by:

$$m = \left[\frac{V \cdot X_{O_2}}{X} - V\right] \cdot \frac{\rho_{LN}}{\alpha}$$

wherein m is a mass of the liquid nitrogen injected, kg; x is an oxygen content of a fire extinguishing target, %; V is a volume of a protection area, $m^3$; $\rho_{LN}$ is a density of the liquid nitrogen; α is an expansion volume ratio of the liquid nitrogen during gasification, which is 717 at 25° C.; and $X_{O_2}$ is a volume fraction of oxygen in atmosphere, with a value of 21%.

9. The mobile liquid nitrogen fire extinguishing system for a utility tunnel according to claim 2, wherein the liquid nitrogen production assembly comprises an air compressor, a nitrogen production machine, and a refrigeration liquefier which are all arranged in a mobile vehicle; and the air compressor is provided with an air inlet on a side thereof, and an output end of the air compressor is connected to the nitrogen production machine and the refrigeration liquefier in sequence, and an output end of the refrigeration liquefier is connected to the liquid nitrogen storage tank.

10. The mobile liquid nitrogen fire extinguishing system for a utility tunnel according to claim 9, wherein the branch pipes comprise three branch pipes arranged in layers and arranged at a top, a middle, and a bottom inside the utility tunnel respectively, each of the liquid nitrogen injection ports on a corresponding one of the three branch pipes is provided with a sensor, the sensor is connected to a master control of the utility tunnel, and the master control of the utility tunnel transmits alarm and positioning information to the controller.

11. The mobile liquid nitrogen fire extinguishing system for a utility tunnel according to claim 10, wherein the liquid nitrogen booster pump is provided with a gas outlet.

* * * * *